Dec. 11, 1923.  
W. V. CALLENDER  
SELF HEATING SOLDERING IRON  
Filed Nov. 20, 1920  
1,476,948
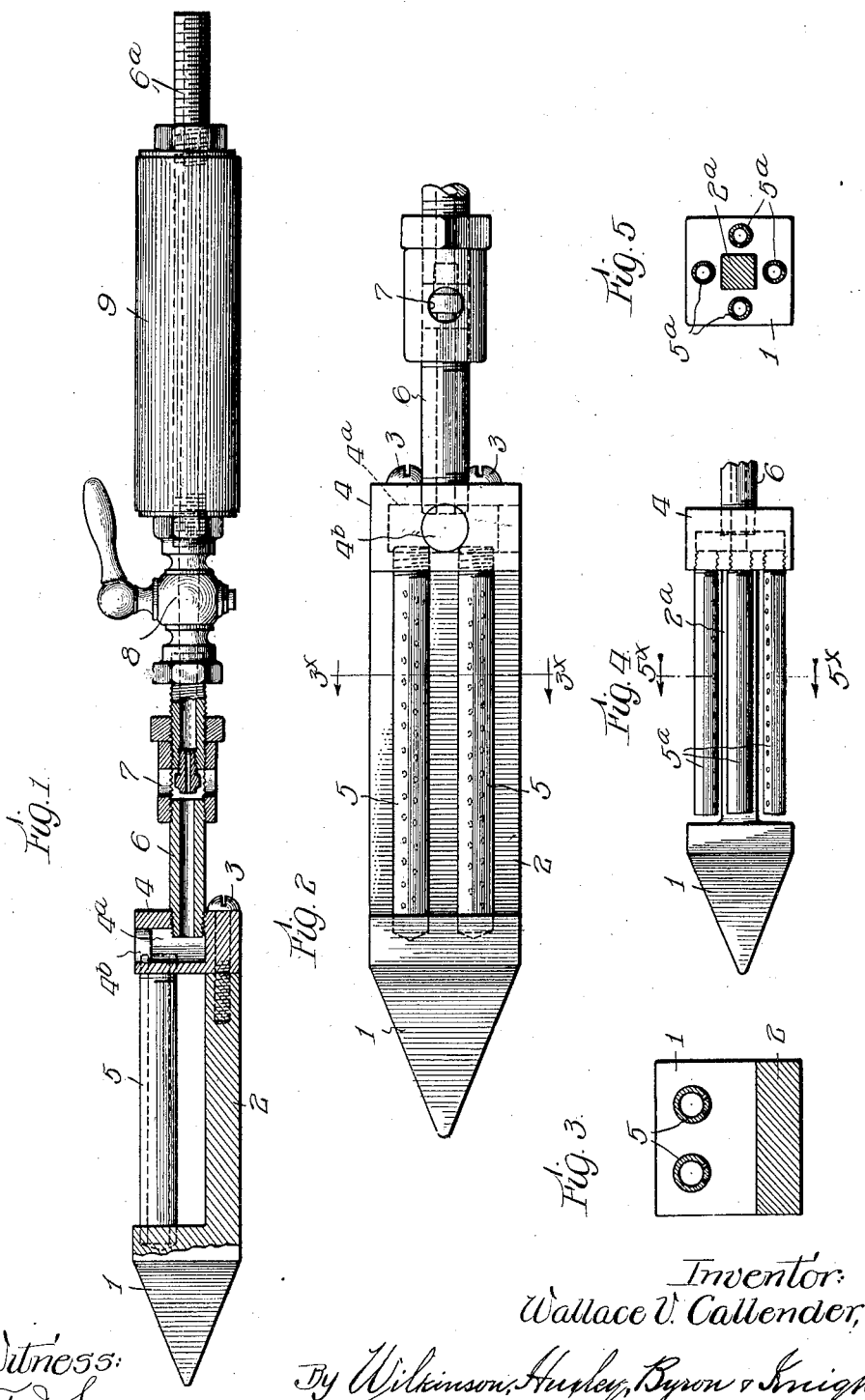
Inventor:  
Wallace V. Callender,  
By Wilkinson, Huxley, Byron & Knight,  
Attys.
Witness:  
J. J. Sauser.

Patented Dec. 11, 1923.

1,476,948

UNITED STATES PATENT OFFICE.

WALLACE V. CALLENDER, OF CHICAGO, ILLINOIS.

SELF-HEATING SOLDERING IRON.

Application filed November 20, 1920. Serial No. 425,310.

*To all whom it may concern:*

Be it known that I, WALLACE V. CALLENDER, a citizen of the United States, residing at Chicago, in the county of Cook and State of Illinois, have invented certain new and useful Improvements in Self-Heating Soldering Irons, of which the following is a specification.

This invention relates to self-heating soldering irons, and is designed primarily for embodiment in a soldering iron in which gaseous fuel is burned as a source of heat.

The object of the invention is to provide a self-heating soldering iron which will maintain high heating efficiency without obstructing any part of the pyramidal head of the tool, or adding undue encumbrance to the construction or dimensions of the tool, or causing inconvenience in the use of the tool. Accordingly, one feature of the invention consists in associating the heat developing element with a heating bar extending rearwardly from the working head of the soldering iron, and of such section and inherent conductivity as will enable it to convey, by conduction and without chokage, sufficient heat units to keep the head at an efficient soldering temperature; the heating element together with the rearward extension being kept well within the readwardly projected overall transverse dimensions of the soldering head so that the device will be restricted to proportions that will enable it to be manipulated with convenience and without detracting from the skill of the average person familiar with the use of a soldering iron. In the preferred embodiment of the invention, the heat transmitting bar and the heating element will be so related that the bar will serve to screen the flame of the burners from the eyes of the user and thus avoid a frequent source of annoyance in gas heated soldering irons.

A further object is to provide a construction of soldering iron that will insure cheap and durable assembly as well as efficiency in transmission and combustion of the fuel. Accordingly, a further feature consists in providing at the rear end of the transmitting bar, a connecting block which is firmly secured to the rear end of the conducting bar and supports the heating elements in proper relation to the bar; said block being hollow and serving as a distributor of the mixture of fuel and air to the several burners of the heating element, and also as a means for connecting the rearwardly extending tubular shank in which are embodied the gas mixer and controlling valve, and upon which is mounted a suitable handle.

In the accompanying drawing, in which two embodiments of the invention are shown by way of illustration,—

Figure 1 is a side elevation, partly in axial section, of the preferred embodiment of the device.

Figure 2 is a bottom plan view of a portion of the device shown in Figure 1 on an enlarged scale.

Figure 3 is a section on the line 3ˣ—3ˣ of Figure 2.

Figure 4 shows the front portion of a modified construction of soldering iron; and Figure 5 is a section on the line 5ˣ—5ˣ of Figure 4.

1 represents the head of the iron which may be of conventional construction. Extending rearwardly from the head 1 is a heat conducting bar 2 which is of sufficient section and inherent conductivity to convey, by conduction, heat units sufficient to keep the head 1 at an efficient soldering temperature. Bar 2 is preferably integral with the head 1 and of the same metal, for instance, copper, or brass, or other alloy of copper. Secured to the rear end of the bar 2, as, for instance, by screws 3, is a connecting block 4 which is preferably of the same transverse section as the base of the pyramidal head 1 of the soldering iron. This head supports the heating element, which preferably consists of a pair of tubes 5, 5, having their rear ends threaded into the block 4, and preferably with their front ends countersunk in or otherwise seated against the head 1. Perforations through the walls of these tubes 5, which are presented toward the heating bear 2, permit the escape of fuel mixture and adapt the tubes to serve as burners in the heating element. Block 4 is made hollow, as, for instance, by providing it with a bore $4^a$ closed by the plug $4^b$, or otherwise providing a cavity therein, and is thus adapted to distribute fuel mixture to the burners 5. A combined shank and fuel feed conduit 6 is tapped into the block 4 and has embodied in its construction a suitable air mixer 7 and a controlling cock 8. The rear portion $6^a$ of the shank or conduit is also provided with a handle 9 of wood or other non-conducting material.

As will be better seen from Figures 2 and 3, the conducting bar 2 affords a substantial screen for the flame from the burners 5, and is thus not only rendered efficient in the absorption of the heat from said burners but serves as an effective screen to intercept light from the flame which might otherwise interfere with proper observation of the work by the user of the device.

Some of the advantages of the present invention may be realized with a construction such as shown in Figures 4 and 5, according to which the conducting bar 2ᵃ is centrally located with relation to the head 1 and connecting block 4, and burner tubes 5ᵃ are symmetrically distributed around said bar with their jet openings for the escape of fuel directed toward the bar, and with the entire group of burners kept well within the overall transverse dimensions of the head and connecting block. In this construction the outer surfaces of the burner tubes will largely screen the eyes of the user from the light of the flame.

I claim:

1. In a soldering iron, a head, a heat transmitting bar extending rearwardly from said head and having a section sufficient to convey, by conduction, heat necessary to keep the head at soldering temperature, and a heating element arranged parallel with said bar and mounted in a position to impart heat to the same, said heat transmitting bar and said heating element being located within the rearwardly projecting overall transverse dimensions of said head.

2. In a soldering iron, a head, a heat conducting bar extending rearwardly from said head and having a section sufficient to convey, by conduction, heat necessary to keep the head at a soldering temperature, a heating element also lying in rear of said head in heating relation to said bar, and a connecting block supporting said bar and heating element, said heat conducting bar and said heating element being located within the rearwardly projecting overall transverse dimensions of said head.

3. In a soldering iron, a head, a heat conducting bar extending rearwardly from said head and having a section sufficient to convey, by conduction, heat necessary to keep the head at a soldering temperature, a heating element also lying in rear of said head in heating relation to said bar, and a connecting block supporting said bar and heating element; said heating element comprising a plurality of burner tubes; and said block being constructed with a distributing chamber supplying fuel to said burner tubes, said heat conducting bar, heating element and block being located within the rearwardly projecting overall transverse dimensions of said head.

4. In a soldering iron, a head, a heat absorbing bar extending rearwardly from said head and parallel to the axis thereof, said bar having sufficient capacity of heat conduction to transmit heat to maintain the head at soldering temperature, a connecting block carrying said bar and the head through the medium of said bar, and burner tubes arranged parallel with said bar, in rear of said head, and supported by said block; said bar and burner tubes being located within the rearwardly projected overall transverse dimensions of the head.

5. In a soldering iron, a head, a heat absorbing bar extending rearwardly from and carrying said head and having a section sufficient to convey, by conduction, heat necessary to keep the head at soldering temperature, a connecting block secured to the rear end of said bar, burner tubes lying in rear of said head in heating relation to said bar and supported by said connecting block, said connecting block having a fuel supply chamber in communication with said burner tubes, and a combined fuel conduit and handle shank extending rearwardly from said connecting block, said heat absorbing bar, block and burner tubes being located within the rearwardly projecting overall transverse dimensions of said head.

6. In a soldering iron, a head, a heat absorbing bar extending rearwardly from said head and adapted to transmit, by conduction, heat sufficient to keep the head at soldering temperature, and a heating element also extending rearwardly from the head and in heating relation to the heat absorbing bar; said heat absorbing bar being adapted to screen the flame of said heating element.

7. In a soldering iron, a head having a substantially rectangular base, a heat absorbing bar coextensive with one dimension of the head and extending rearwardly from one side thereof with sufficient section to conduct heat necessary to keep the head at soldering temperature but leaving a portion of the head offset laterally therefrom, and a heating element extending rearwardly from said offset portion of the head in parallel relation to the heat absorbing bar and in position to have its flame screened by said bar.

Signed at Chicago, Illinios, this 18th day of November, 1920.

WALLACE V. CALLENDER.